US 6,552,656 B2

(12) United States Patent
Polidi et al.

(10) Patent No.: US 6,552,656 B2
(45) Date of Patent: Apr. 22, 2003

(54) METHOD AND APPARATUS FOR GENERATING NOTIFICATION OF CHANGED CONDITIONS BEHIND A VEHICLE

(75) Inventors: Ari I. Polidi, Mountain View, CA (US); James Nolan, Boulder Creek, CA (US)

(73) Assignee: Horizon Navigation, Inc., Santa Clara, CA (US)

( * ) Notice: Subject to any disclaimer, the term of this patent is extended or adjusted under 35 U.S.C. 154(b) by 0 days.

(21) Appl. No.: 09/834,556

(22) Filed: Apr. 12, 2001

(65) Prior Publication Data

US 2002/0149475 A1 Oct. 17, 2002

(51) Int. Cl.⁷ .................................................. B60Q 1/00
(52) U.S. Cl. ....................... 340/436; 340/435; 340/903; 701/301
(58) Field of Search .............................. 340/436, 425.5, 340/435, 438, 903, 904; 701/301; 180/169, 271, 274

(56) References Cited

U.S. PATENT DOCUMENTS 5,212,467 A * 5/1993 Park ............................ 340/435
5,754,123 A * 5/1998 Nashif et al. ................ 340/903
6,161,066 A * 12/2000 Wright et al. ................. 701/36
6,204,754 B1 * 3/2001 Berstis ........................ 340/435
6,218,960 B1 * 4/2001 Ishikawa et al. ............. 340/901
6,259,359 B1 * 7/2001 Fujinami et al. ............. 340/435
6,292,111 B1 * 9/2001 Ishikawa et al. ............. 340/937
6,360,170 B1 * 3/2002 Ishikawa et al. ............. 701/300

* cited by examiner

Primary Examiner—Toan Ngoc Pham
(74) Attorney, Agent, or Firm—Beyer, Weaver & Thomas, LLP.

(57) ABSTRACT

According to the present invention, methods and apparatus are provided to generate notification about condition changes behind a vehicle. Information about a first set of conditions behind a vehicle is gathered at a first point in time. Information can be gathered using imaging devices, infrared detectors, distance meters, light intensity sensors, and timing devices. At a later point in time, information about a second set of conditions behind the vehicle is gathered. The information gathered at a first point in time is compared to the information gathered at the later point in time to determine differences between the conditions behind the vehicle. If the differences meet a notification criterion, a notification is generated conveying information about the changed conditions behind the vehicle.

50 Claims, 3 Drawing Sheets

METHOD AND APPARATUS FOR GENERATING NOTIFICATION OF CHANGED CONDITIONS BEHIND A VEHICLE

BACKGROUND OF THE INVENTION

The present invention relates to an object sensing system. The present invention is associated with a method and apparatus for detecting objects behind a vehicle. More specifically, the present invention provides an object detection system that compares information gathered at two different points in time and determines whether to generate a notification about changed conditions behind a vehicle.

Current rearview object detection systems include rearview mirrors and sensor systems. Rearview mirrors typically provide the driver with inadequate rearview information, since they can not convey information on objects located in blind spots alongside the vehicle or show objects beneath the rear of the vehicle. Mirrors are also often ignored by drivers backing up a vehicle. Sensor systems detect objects behind the vehicle and audibly warn the driver. Some systems increase the frequency of audible warnings as the object nears the rear of the vehicle. However, sensor systems typically can not distinguish between different types of objects.

Other sensor systems mount video cameras to the rear and side of a vehicle that feeds images directly to a screen or display that the driver views. The video cameras show three separate screens of information to a driver. The three separate screens may display imagery in addition to the reflections shown by the vehicle's rearview mirrors. The video imagery, however, can be too much information for the driver to quickly interpret. The imagery can also be distracting, and interfere with the concentration of the vehicle operator.

Each of the currently available techniques for generating notification about the changed conditions behind a vehicle have disadvantages with regard to at least some of the desirable characteristics of systems for presenting information about the condition changes behind a vehicle. It is therefore desirable to provide a system for generating notification about rearward condition changes that exhibit desirable characteristics as well or better than the technologies discussed above.

SUMMARY OF THE INVENTION

According to the present invention, methods and apparatus are provided to generate notification about condition changes behind a vehicle. Information about a first set of conditions behind a vehicle is gathered at a first point in time. Information can be gathered using imaging devices, infrared detectors, distance meters, light intensity sensors, and timing devices. At a later point in time, information about a second set of conditions behind the vehicle is gathered. The information gathered at a first point in time is compared to the information gathered at the later point in time to determine differences between the conditions behind the vehicle.

The information gathered can be used to create archetypes. The archetypes can include representations based on edge, line, or texture information from digital imagery. Other archetypes can include information from infrared imagery. The archetypes are compared to determine differences between the archetypes representing separate conditions behind the vehicle. If the differences meet a notification criterion, a notification is generated conveying information about the changed conditions behind the vehicle.

One aspect of the invention provides a computer-implemented method for conveying information about a change in conditions behind a vehicle. The method may be characterized by the following sequence: (1) gathering first information about a first set of conditions behind the vehicle at a first time; (2) gathering second information about a second set of conditions behind the vehicle at a second time later than the first time; (3) comparing the first information and the second information to determine differences between the first set of conditions and the second set of conditions behind the vehicle; (4) determining whether the differences meet a notification criterion; and (5) generating a notification conveying information about a change in conditions behind a vehicle where the differences meet the notification criterion.

The first information can be gathered when the vehicle stops momentarily or is parked. Archetypes for the first and second information are created to allow comparison between first and second information. Quantitative values can be assigned to the differences between archetypes. Archetypes may be generated using edge detection schemes, infrared gradations, texture information, or distance measurements. The quantitative values are multiplied by weighting factors to determine the composite difference between first and second information. The composite difference is compared to a threshold value to determine whether to generate notification about changed conditions behind a vehicle.

Another aspect of the present invention relates to a method for conveying information about changed conditions behind a vehicle. The method may be characterized by the following sequence: (1) gathering first information about first rearward conditions; (2) recognizing that the vehicle is in reverse; (3) gathering second information about second rearward conditions, wherein gathering second information about second rearward conditions occurs after gathering first information about first rearward conditions; (4) creating a first archetype from first information about first rearward conditions; (5) creating a second archetype from second information about second rearward conditions; (6) comparing the first and second archetypes to determine differences between first rearward conditions and second rearward conditions behind the vehicle; and (7) generating a notification conveying information about changed conditions behind a vehicle upon determining that the differences meet a notification criterion.

Comparing the first and second archetypes can include subtracting the first archetype from the second archetype to determine the difference between archetypes. A quantitative value can then be assigned to the difference between archetypes.

Another aspect of the invention is an apparatus for conveying information about changed conditions behind a vehicle. The apparatus can be characterized by the following features: (1) a sensor system for generating data representations of a first set of conditions behind a vehicle at a first time and a second set of conditions behind a vehicle at a second time; (2) a processor coupled to the sensor system, the processor configured to compare the data representations of the first and second set of conditions behind the vehicle to determine differences between the first set of conditions and the second set of conditions; (3) a notification device coupled to the processor, wherein a notification about changed conditions behind a vehicle is conveyed upon determining that the differences meet a notification criterion.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

DESCRIPTION OF SPECIFIC EMBODIMENTS

Figure 1:
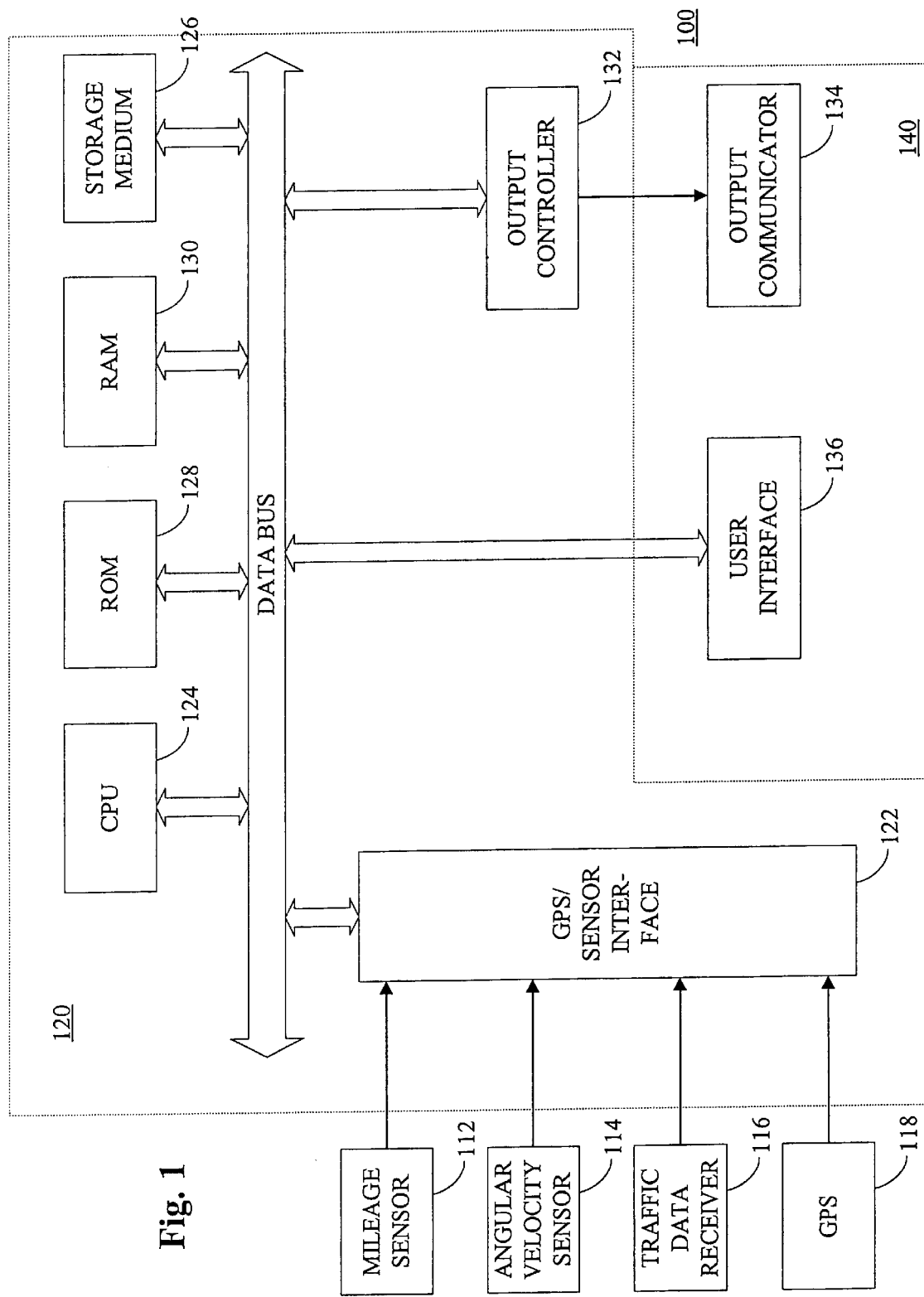
FIG. 1 is a block diagram of a vehicle navigation system that may be used with the present invention, according to specific embodiments.

FIG. 1 is a block diagram of a vehicle navigation system 100 that may be used with specific embodiments of the present invention. Sensors 112 and 114, traffic data receiver 116, and GPS receiver 118 are coupled to computing means 120 through sensor/GPS interface 122. In typical embodiments, mileage sensor 112 comprises an odometer, and angular velocity sensor 114 comprises a gyroscope, or a differential odometer coupled to the wheels of the vehicle. Traffic data receiver 116 may comprise any of a wide variety of RF receivers that are operable to receive real time traffic data transmitted in a variety of formats. A global positioning system (GPS) data receiver 118 is provided for receiving signals from, for example, a satellite-based navigation system. Data from sensor/GPS interface 122 is transmitted to CPU 124, which performs calibration, signal processing, dead-reckoning, vehicle positioning, and route calculation and guidance functions. A database containing map information may be stored in database medium 126, with software directing the operation of computing means 120 stored in main memory 128 for execution by CPU 124. Memory 128 may comprise any of a wide variety of non-volatile memory such as, for example, read-only memory (ROM), reprogrammable non-volatile memory such as flash memory or SRAM, CD ROM, optical disk, PCMCIA cards or the like. System RAM 130 permits reading and writing of the information necessary to execute such software programs. Database medium 126 may comprise non-volatile memory, a hard disk drive, CD-ROM, or an integrated circuit in which digitized map information has been stored. Output controller 132, which may comprise a graphics controller, receives data processed by CPU 124 and transmits the data to display console 140 which includes output communicator 134, usually comprising a display screen. The user may input data, such as a desired destination, through user interface 136. User interface 136 may comprise, but is not limited to, a keyboard or a remote control.

The map database stored in database medium 126 preferably comprises positional data such as, for example, latitude and longitude coordinates, to describe road intersections or nodes, road segments, landmarks and points of interest, and other geographical information. The database may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a hierarchy value that relates to the category or type of the road. For example, the highest level category of the hierarchy includes freeways and expressways. The lowest level includes residential streets and/or alleys. The information stored in map database medium 126 is employed with the data received from interface 122 for route calculation and guidance.

Figure 2:
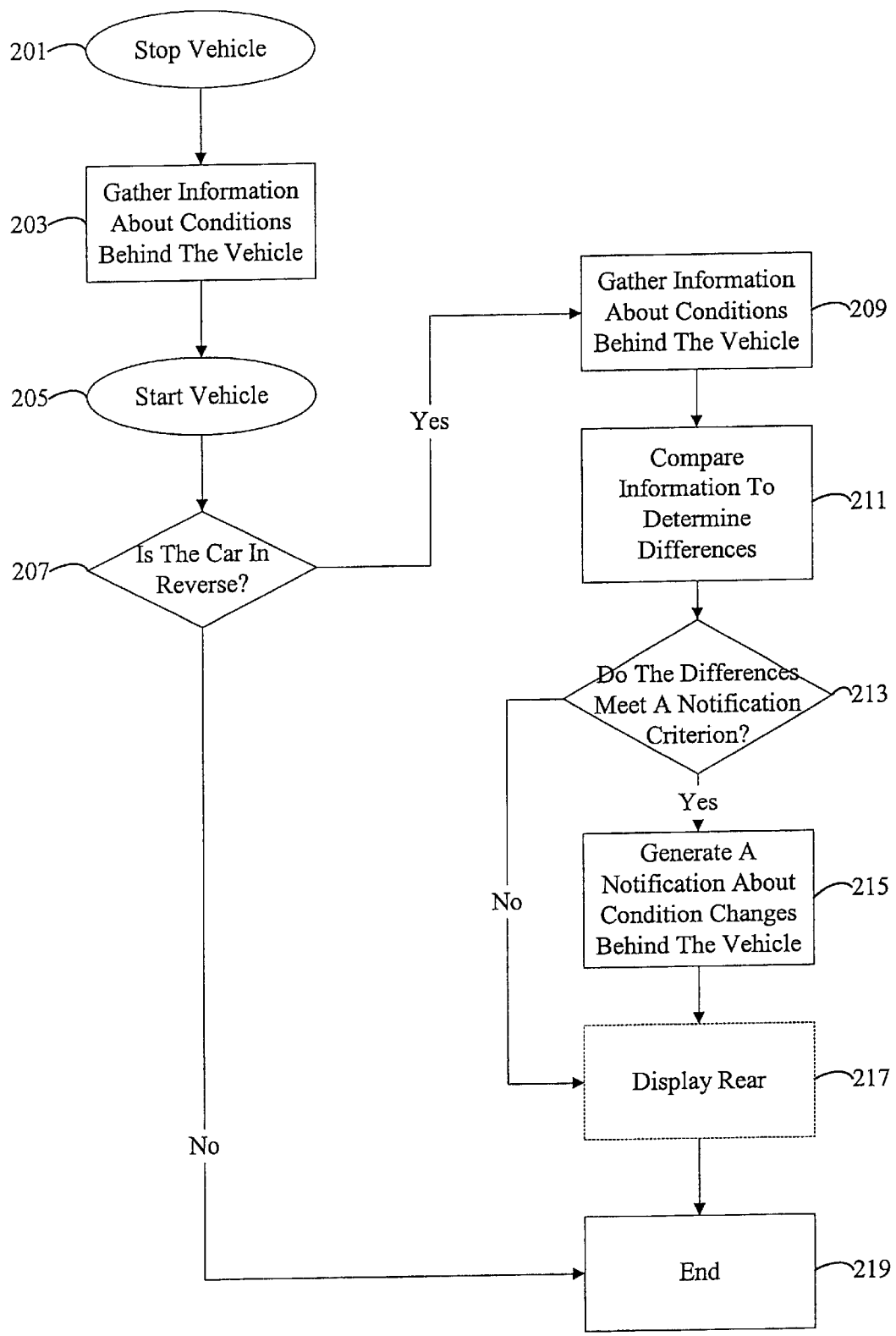
FIG. 2 is a flow diagram illustrating the process of detecting changed condition behind a vehicle and informing a vehicle operator, according to specific embodiments.

FIG. 2 is a flow diagram illustrating a specific embodiment of the process of gathering information about conditions behind a vehicle and conveying information to a vehicle operator. The vehicle stops at 201. Various sensors gather information about conditions behind a vehicle at 203. Information may be gathered, for example, with devices such as ultrasonic distance detectors, laser radar, imaging devices, light intensity meters, and infrared sensors. Such devices allow the rearview condition comparison system to gather information about the current environment behind a vehicle. The information gathered can include light intensity, arrangement of objects, object proximity, edge locations, time, and object temperature.

According to various embodiments, when the vehicle again begins to move at 205, the rearview condition comparison system identifies whether the car is in reverse. If the car is not in reverse, no conditions require comparison and the process is completed at 219. If the car is in reverse, the rearview condition comparison system again gathers information about the conditions behind the vehicle. The comparison system can detect whether the vehicle is in reverse at 207 through direct monitoring of the transmission or by sensing the direction of the wheel spin. When the rearview condition comparison system determines that the vehicle is in reverse, the system gathers information about the environment behind the vehicle.

The information gathered can again include light intensity, arrangement of objects, object proximity, edge locations, time, and object temperature. At 211, the information gathered at 209 is compared with the information gathered at 203 after the vehicle was initially stopped. For example, information gathered at 203 may show that a large vehicle is located 5 meters behind the vehicle with the rearview condition comparison system. According to one embodiment, an infrared detector may determine that the engine compartment of the vehicle is cold and therefore the vehicle is parked.

Information gathered at 209, after the rearview condition comparison system recognizes that the vehicle is now in reverse, may show that a different vehicle is now parked in back. The information may also show the outline of a bicycle ridden by a person, or the outline of a cat sleeping behind the wheel well. The information is used to construct one or more archetypes of the environment behind the vehicle at 203 and 209. The archetypes are compared to determine the differences between the conditions behind the vehicle (211). Archetypes can be compared by subtracting a first archetype from a second archetype. If the differences meet a notification criterion at 213, a notification is generated about condition changes behind the vehicle at 215. Multiple notification criteria can be used.

Generally, a factor used in determining whether a notification about conditions or condition changes behind a vehicle should be generated is referred to herein as a notification criterion. According to specific embodiments, an example of a notification criterion is a threshold value. A quantitative value, based on the number and significance of edges found after a first archetype is subtracted from a second archetype, can be assigned to the differences between archetypes. If the assigned quantitative value exceeds a predetermined threshold value, the notification criterion at 213 has been met.

According to other embodiments, a notification criterion is met if the difference between two archetypes resembles a third archetype stored in a database. The archetype database may include a number of polygonal representations of human forms. A finding that the differences between a first archetype and a second archetype is a polygonal shape resembling a representation of the human form in the database would meet the notification criterion. A notification would be generated regarding the changed conditions behind the vehicle.

According to various embodiments, information can be conveyed about changed conditions using a notification device. Notification devices include LEDs, video displays, alarms, and speakers. The notification device can also be the output communicator of a vehicle navigation system. Alternatively, the rearview condition comparison system may forcibly override the vehicle operator and prevent the vehicle from backing up. According to one embodiment, a video image of the rear is transmitted to the output communicator such as a vehicle navigation system display screen to inform the driver of the changed condition. According to various embodiments, the image of the rear can also be displayed at 217 when the vehicle is backing up even if the difference between the conditions behind the vehicle at 203 and 209 is not significant. The rearview condition comparison system may also vary notification methods based on the notification criterion met by the differences between the prior conditions and the present conditions. For example, notification criteria can be based on a number of threshold levels. If the difference exceeds all of the threshold levels, the system may forcibly override the vehicle operator. On the other hand, if the difference exceeds only one threshold, the rearview condition comparison system may audibly warn the driver. Otherwise, the system may simply display a rearview image on the vehicle navigation system display screen.

Figure 3:
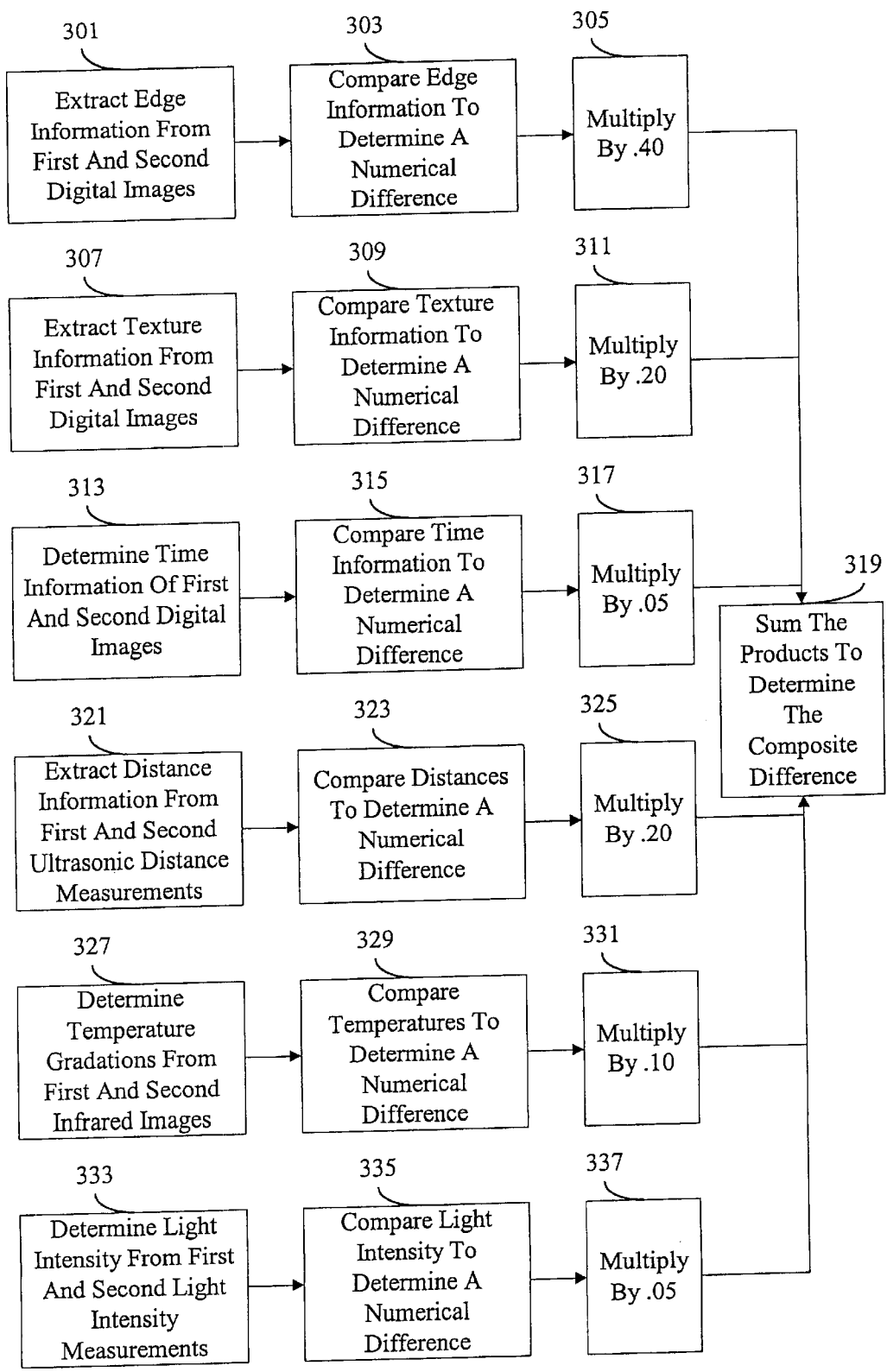
FIG. 3 is a flow diagram depicting the comparison of condition information gathered at different times, according to specific embodiments.

FIG. 3 is a flow diagram depicting a specific embodiment of the comparison of condition information gathered at different times. The process of FIG. 3 may be used to implement step 211 of FIG. 2. Edge information is extracted from the first and second digital images (301). Edge detection and image processing techniques are described in *Algorithms for Image Processing and Computer Vision,* James Parker, John Wiley & Sons, Inc. (1996), incorporated herein by reference for all purposes. The edge information of the first image is an example of an archetype for the first image. The archetypes of the first and second images are compared, yielding the difference between the two archetypes (303). According to various embodiments, the significance of the edges and lines in the difference between the two archetypes is used to determine a numerical value associated with the difference between the two archetypes. The value is used to determine whether the driver should be notified of the rearward conditions behind the vehicle. According to specific embodiments, the comparison is then complete. The value can then be measured against a threshold and, if the value exceeds a particular threshold, action is taken to inform the driver of the rearward conditions (see FIG. 2 and the corresponding description).

According to other embodiments, more than one archetype is created for the first and second rearward conditions. For example, additional archetypes may be created for the first and second digital images using primarily texture information (307). Texture information can be used to divide an image into different regions with similar texture patterns or attributes. The archetypes created from texture information can include different regions segmented by pattern. According to specific embodiments, the archetypes created using texture information are compared to determine a numerical difference (309).

The time lapse can also be used to determine a numerical difference. The time lapse between the gathering of the first information and second information about rearward conditions behind a vehicle may be determined (313). The time lapse can then be used to generate another numerical value (315). Similarly, archetypes can be constructed using distance measurements, infrared imagery, and light intensity measurements (321, 327, 333). The archetypes are compared or subtracted to determine a difference, and a numerical value is assigned to the differences between the first and second archetypes (323, 329, and 335). According to various embodiments, the values are multiplied by weighting factors based on the significance of the factor. For example, at 305, the numerical differences associated with the differences between the edge information is multiplied by a value of 0.40. The numerical value associated with texture differences between the first and second digital images is multiplied by 0.20 (311). The value associated with the time lapse between the gathering of the first and second information is multiplied by 0.05 (317). The weighted values are summed at 319 to determine an overall value representing the differences between the first information about rearward conditions and the second information about rearward conditions.

The size of the weighting factors (305, 311, 317, 325, 331, and 337) relates to the importance of the corresponding components of the overall value. According to specific embodiments, edge information from digital imagery is considered more important than texture information from digital imagery in determining whether to inform the driver of rearward conditions and is therefore given a weighting value of 0.40 versus a value of 0.20 for the texture information. However, texture information from digital imagery may be determined to be more important than the amount of time that has lapsed as illustrated by assignment of the factors of 0.20 and 0.05, in this example. The products of the weighting factors and the quantitative differences are summed to determine an overall value referred to herein as a composite difference. The composite difference is compared to various thresholds to determine a course of action. For example, a composite difference greater than 40 may cause a rearward image to be displayed on the output communicator such as a vehicle navigation system display screen device. A composite difference greater than 60 may lead to a display of a rearward image along with the occurrence of an audible tone. A composite difference greater than 80 may cause the display of a rearward image, an audible tone, and the temporary cessation of vehicle movement.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of detection devices, sensors, imaging equipment and should not be restricted to the ones mentioned above. Although the present invention may be used with a vehicle navigation system, a vehicle navigation system is not necessary to practice the present invention. Therefore, the scope of the invention should be determined with reference to the appended claims.

What is claimed is:

1. A computer-implemented method for conveying information about a change in conditions behind a vehicle, the method comprising:
    gathering first information about a first set of conditions behind the vehicle at a first time;
    gathering second information about a second set of conditions behind the vehicle at a second time later than the first time;
    comparing the first information and the second information to determine a plurality of differences between the first set of conditions and the second set of conditions behind the vehicle;
    determining whether the plurality of differences meet a notification criterion, wherein determining whether the plurality of differences meet the notification criterion comprises combining the plurality of differences with a plurality of weighting factors to derive a composite difference; and
    generating a notification conveying information about a change in conditions behind a vehicle where the plurality of differences meet the notification criterion.

2. The method of claim 1 wherein gathering first information about the first condition behind the vehicle occurs when the vehicle is stopped.

3. The method of claim 2 wherein gathering first information about the first condition behind the vehicle occurs when the vehicle is parked.

4. The method of claim 1, wherein gathering second information occurs upon recognizing that the vehicle is in reverse.

5. The method of claim 1, wherein gathering second information occurs upon recognizing that the vehicle is started.

6. The method of claim 1, wherein comparing the first information and the second information comprises:
    creating a first archetype from first information about first conditions; and
    creating a second archetype from second information about second conditions.

7. The method of claim 6, wherein comparing the first information and the second information further comprises:
    subtracting the first archetype from the second archetype to determine the difference between first information and second information.

8. The method of claim 7, wherein comparing the first information and the second information further comprises:
    assigning a quantitative value to the difference between first information and second information.

9. The method of claim 8, wherein significant differences between first information and second information exist when the quantitative value exceeds a predetermined value.

10. The method of claim 6, wherein comparing the first information and the second information further comprises determining differences in light intensity levels.

11. The method of claim 6, wherein the first archetype and the second archetype are generated using digital imagery.

12. The method of claim 6, wherein the first archetype and the second archetype are generated using infrared imagery.

13. The method of claim 8, wherein the quantitative value is multiplied by a weighting factor.

14. A computer-implemented method for conveying information about changed conditions behind a vehicle, the method comprising:
    gathering first information about first rearward conditions;
    recognizing that the vehicle is in reverse;
    gathering second information about second rearward conditions, wherein gathering second information about second rearward conditions occurs after gathering first information about first rearward conditions;
    creating a first archetype from first information about first rearward conditions;
    creating a second archetype from second information about second rearward conditions;
    comparing the first and second archetypes to determine differences between first rearward conditions and second rearward conditions behind the vehicle; and
    generating a notification conveying information about changed conditions behind a vehicle upon determining that the differences resemble a third archetype stored in a database.

15. The method of claim 14 wherein gathering first information about the first rearward conditions occurs when the vehicle is stopped.

16. The method of claim 15 wherein gathering first information about the first rearward conditions behind the vehicle occurs when the vehicle is parked.

17. The method of claim 14, wherein comparing the first information and the second information further comprises:
    subtracting the first archetype from the second archetype to determine the difference between first information and second information.

18. The method of claim 17, wherein comparing the first information and the second information further comprises:
    assigning a quantitative value to the difference between first information and second information.

19. The method of claim 18, wherein significant differences between first information and second information exist when the quantitative value exceeds a predetermined value.

20. The method of claim 14, wherein comparing the first information and the second information further comprises determining differences in light intensity levels.

21. The method of claim 14, wherein the first archetype and the second archetype are generated using digital imagery.

22. The method of claim 14, wherein the first archetype and the second archetype are generated using infrared imagery.

23. The method of claim 18, wherein the quantitative value is multiplied by a weighting factor.

24. A computer program product comprising a machine readable medium on which is provided program instructions for conveying information about a change in conditions behind a vehicle, the computer program product comprising:
    computer code for gathering first information about a first set of conditions behind the vehicle at a first time;
    computer code for gathering second information about a second set of conditions behind the vehicle at a second time later than the first time;

computer code for comparing the first information and the second information to determine a plurality of differences between the first set of conditions and the second set of conditions behind the vehicle;

computer code for determining whether the plurality of differences meet a notification criterion, wherein determining whether the plurality of differences meet the notification criterion comprises combining the plurality of differences with a plurality of weighting factors to derive a composite difference; and computer code for generating a notification conveying information about a change in conditions behind a vehicle where the plurality of differences meet the notification criterion.

25. The computer program product of claim 24 wherein gathering first information about the first condition behind the vehicle occurs when the vehicle is stopped.

26. The computer program product of claim 25 wherein gathering first information about the first condition behind the vehicle occurs when the vehicle is parked.

27. The method of claim 24, wherein gathering second information occurs upon recognizing that the vehicle is in reverse.

28. The computer program product of claim 24, wherein gathering second information occurs upon recognizing that the vehicle is started.

29. The computer program product of claim 24, wherein comparing the first information and the second information comprises:

creating a first archetype from first information about first conditions; and creating a second archetype from second information about second conditions.

30. The computer program product of claim 29, wherein comparing the first information and the second information further comprises:

subtracting the first archetype from the second archetype to determine the difference between first information and second information.

31. The computer program product of claim 30, wherein comparing the first information and the second information further comprises:

assigning a quantitative value to the difference between first information and second information.

32. The computer program product of claim 31, wherein significant differences between first information and second information exist when the quantitative value exceeds a predetermined value.

33. The computer program product of claim 29, wherein comparing the first information and the second information further comprises determining differences in light intensity levels.

34. The computer program product of claim 29, wherein the first archetype and the second archetype are generated using digital imagery.

35. The computer program product of claim 29, wherein the first archetype and the second archetype are generated using infrared imagery.

36. The computer program product of claim 31, wherein the quantitative value is multiplied by a weighting factor.

37. An apparatus for conveying information about changed conditions behind a vehicle, the apparatus comprising:

a sensor system for generating data representations of a first set of conditions behind a vehicle at a first time and a second set of conditions behind a vehicle at a second time;

a processor coupled to the sensor system, the processor configured to compare the data representations of the first and second set of conditions behind the vehicle to determine a composite difference between the first set of conditions and the second set of conditions, wherein determining the composite difference comprises determining a plurality of differences and combining the plurality of differences using weighting factors;

a notification device coupled to the processor, wherein a notification about changed conditions behind a vehicle is conveyed upon determining that the differences meet a notification criterion.

38. The apparatus of claim 37 wherein gathering first information about the first condition behind the vehicle occurs when the vehicle is stopped.

39. The apparatus of claim 38 wherein gathering first information about the first condition behind the vehicle occurs when the vehicle is parked.

40. The apparatus of claim 37, wherein gathering second information occurs upon recognizing that the vehicle is in reverse.

41. The apparatus of claim 37, wherein gathering second information occurs upon recognizing that the vehicle is started.

42. The apparatus of claim 37, wherein comparing the first information and the second information comprises:

creating a first archetype from first information about first conditions; and creating a second archetype from second information about second conditions.

43. The apparatus of claim 42, wherein comparing the first information and the second information further comprises:

subtracting the first archetype from the second archetype to determine the difference between first information and second information.

44. The apparatus of claim 43, wherein comparing the first information and the second information further comprises:

assigning a quantitative value to the difference between first information and second information.

45. The apparatus of claim 44, wherein significant differences between first information and second information exist when the quantitative value exceeds a predetermined value.

46. The apparatus of claim 42, wherein comparing the first information and the second information further comprises determining differences in light intensity levels.

47. The apparatus of claim 42, wherein the first archetype and the second archetype are generated using digital imagery.

48. The apparatus of claim 42, wherein the first archetype and the second archetype are generated using infrared imagery.

49. The apparatus of claim 44, wherein the quantitative value is multiplied by a weighting factor.

50. The apparatus of claim 49, wherein the quantitative value and the weighting factor are used to determine a composite value.

\* \* \* \* \*